United States Patent Office 3,421,602
Patented Jan. 14, 1969

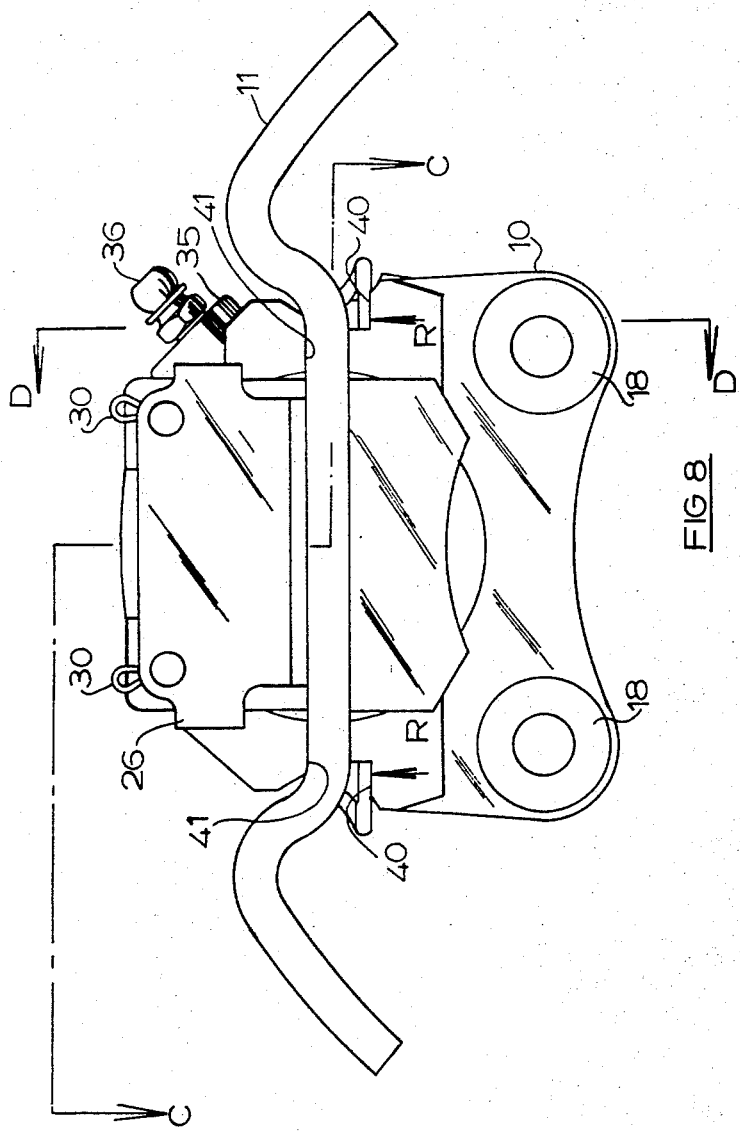

3,421,602
SPOT TYPE DISC BRAKE INCLUDING
SPRING BIASED CALIPER
Haydn L. Craske, Birmingham, England, assignor to
Girling Limited, Birmingham, England
Filed Nov. 8, 1966, Ser. No. 592,903
Claims priority, application Great Britain, Nov. 15, 1965,
48,283/65
U.S. Cl. 188—73                                    15 Claims
Int. Cl. F16d 55/00

ABSTRACT OF THE DISCLOSURE

The invention provides a spot type disc brake in which a yoke is slidably received in longitudinal grooves at opposite sides of a body member containing at least one piston of a hydraulic actuator. One piston bears against the yoke which actuates an indirectly operated pad whilst a second piston (in the case wherein the body member is fixed) or the body member itself (in the case wherein the body member is movable) bears against a directly operated pad. Elongated spring means, such as a leaf spring or a wire spring, are fitted in the grooves between the yoke and the radially inner walls of the grooves to bias the yoke against the radially outer walls of the grooves. The elongated spring means extends longitudinally of the grooves.

---

The present invention relates to a spot type disc brake comprising a body member adapted to support a directly operated brake pad, a yoke slidably received in longitudinal grooves at opposite sides of said body member and adapted to support an indirectly operated brake pad opposed to said directly operated brake pad and a hydraulic actuator operative between said directly operated pad and said yoke.

According to one aspect of the present invention, the yoke is received in the grooves in the body member with substantial clearance and springs are arranged in the clearances between the yoke and that wall of the grooves nearer the axis of the wheel to which the brake is to be fitted to urge the yoke against the opposite walls of the grooves which are further from the wheel axis.

According to another aspect of the present invention, the yoke is received in said grooves with substantial clearance and leaf, wire or similar springs are arranged in the clearances between the yoke and one wall of the grooves to urge the yoke against the opposite walls of the grooves with the leaf, wire or similar springs extending longitudinally of said grooves.

The invention is further described, by way of example, with reference to the accompanying drawings in which:

FIG. 8 is an end elevation of the brake of FIGS. 6 and 7;

Figure 1:
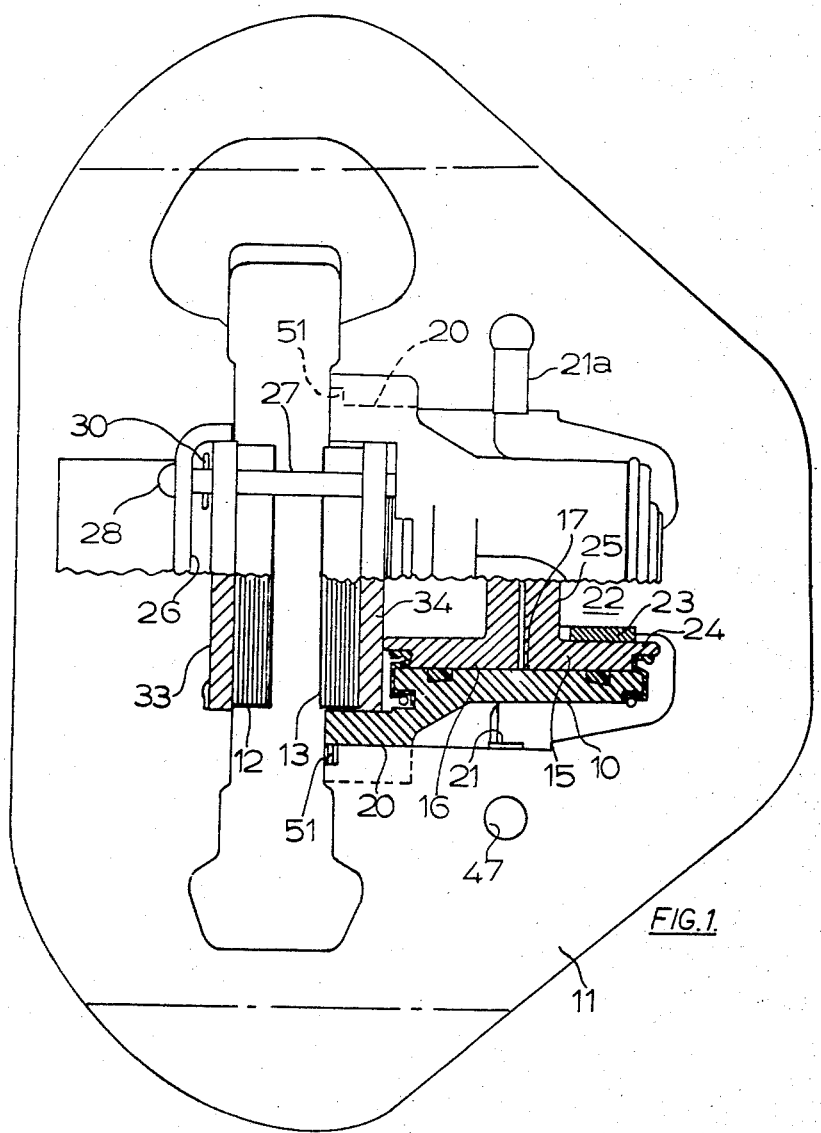
FIG. 1 is a plan view, half sectioned on the line B—B of FIG. 3, of a spot type disc brake constructed in accordance with one embodiment of the invention.
Figure 2:
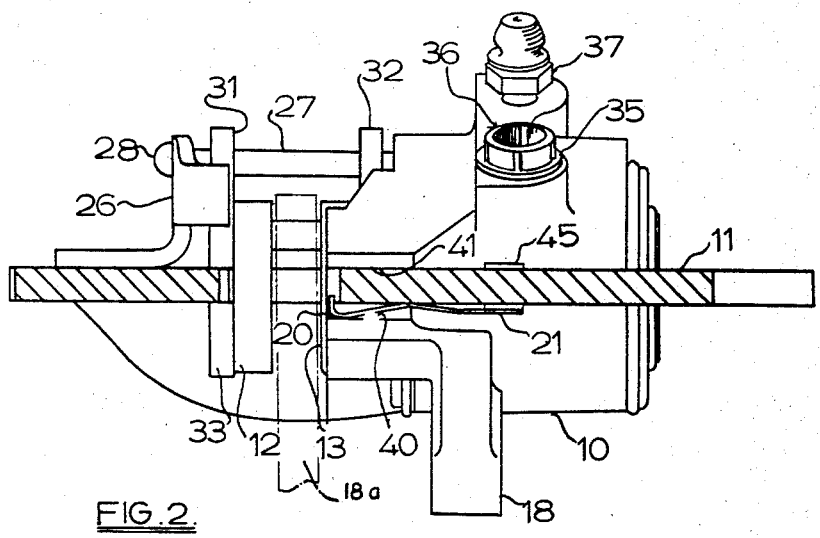
FIG. 2 is a side elevation sectioned on the line A—A of FIG. 3.
Figure 3:
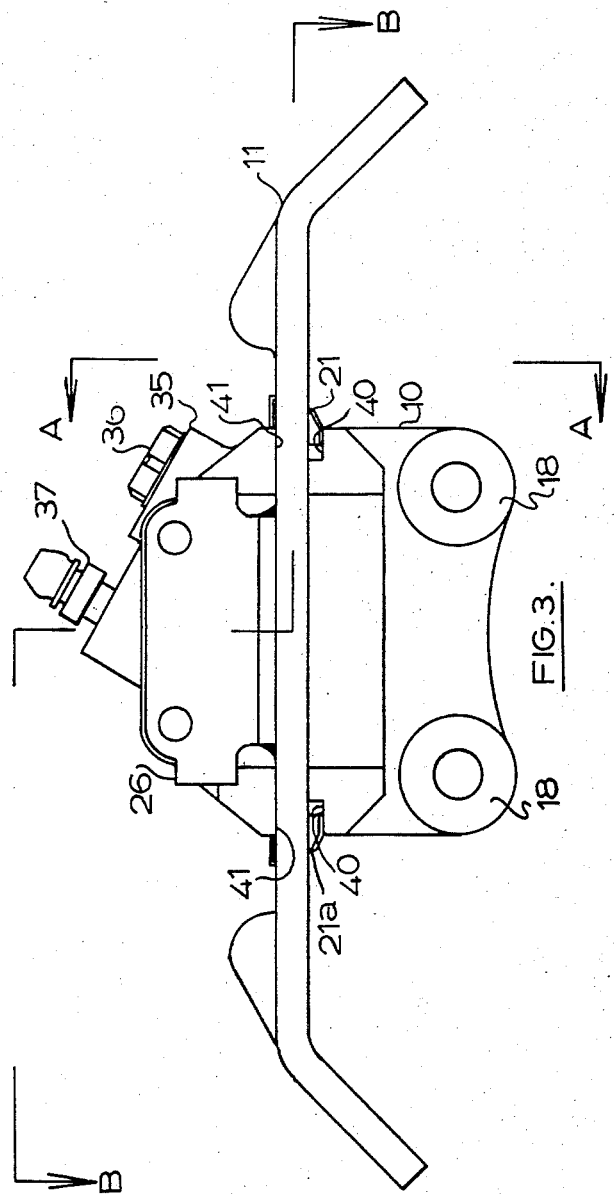
FIG. 3 is an end elevation of the disc brake of FIGS. 1 and 2.

Referring to FIGS. 1, 2 and 3 of the drawings, a spot type disc brake comprises a body member 10, a yoke 11 adapted to support an indirectly operated pad 12 and a hydraulic actuator formed within the body member 10 and operative between the yoke 11 and a directly operated pad 13. The hydraulic actuator comprises a pair of opposed pistons 15 and 16 slidable within a cylinder constituted by a through bore 17 in the body member 10.

The body member 10 has a pair of mounting lugs 18 adapted to be bolted to a torque plate or other fixed part of the wheel mounting (not shown) adjacent a disc 18a so that the disc periphery extends between the pads 12, 13. The body member 10 has a pair of longitudinal grooves 20 formed at opposite sides thereof in which grooves the inside edges of the yoke 11 are guided with clearance. A leaf spring 21 or 21a acts between the radially inner wall 40 of each groove 20 and the yoke to urge the yoke against the radially outer walls 41 of the grooves 20 to avoid spragging. The yoke 11 is also located in the piston 15 by an inwardly extending tongue 22 formed integrally with the yoke and supported by an insert member 23 in a blind bore 24 in the piston 15. The base 25 of the blind bore 24 abuts the end of the tongue 22 to transmit the hydraulically produced force acting on the piston 15 to the yoke 11 and so to the indirectly operated pad 12.

The tongue 22 on the yoke 11 is received in the insert member 23 with only sufficient clearance to prevent binding. The tongue is, therefore accurately located and supported by the piston 15.

A bracket 26 is secured to the yoke 11 adjacent the pad 12 and supports a pair of pad-retaining pins 27 whose other ends are slidably received in suitable bores in the body member 10. The pins 27 have heads 28 to prevent the pins passing right through the bracket 26 and clips 30 hold the pins 27 captive on the brackets 26. Lugs 31 and 32 formed on backing plates 33 and 34 respectively on the pads 12 and 13 have apertures through which pass the pins 27 whereby the pads 12 and 13 are suspended and located in their appropriate positions. The inlet 35 to the hydraulic cylinder 17 is shown closed by a protective plug 36 which is, of course, removed before the appropriate brake conduit is applied to the inlet 35. A bleed screw 37 is provided at the top of the body member 10.

Figure 4:
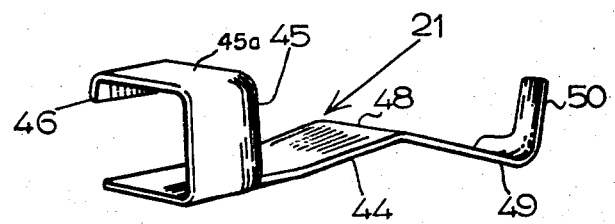
FIG. 4 is a detailed perspective view to a larger scale of one of two leaf springs incorporated in the disc brake of FIGS. 1 to 3.

FIG. 4 shows the leaf spring 21 more clearly. The leaf spring 21 comprises a main resilient portion 44 one end of which is provided with a U-shaped retaining clip 45 which is hooked around the yoke 11 at the inside as can be seen in FIG. 2, with the leg 45a in engagement with the face of the yoke urged against the groove walls 41. The U-shaped retaining clip has at its free end an inward projection 46 which locates in a hole 47 (FIG. 1) in the yoke 11 to prevent the leaf spring sliding longitudinally relative to the yoke 11. The leaf spring has a kink 48 between its ends which bears against the yoke 11 and so ensures that the free end 49 of the leaf spring will be urged against the radially inner wall 40 of the groove 20. It will be seen from FIG. 4 that the free end 49 of the leaf spring 21 is rounded so that there is no danger of the spring biting into the side wall 40 of the groove 20. The leaf spring has at its free end 49 remote from the clip 45 a side projection 50 which locates in a notch 51 in the yoke 11 to prevent the leaf spring from swinging outwardly about the hole 47 and out of the groove clearance between the yoke 11 and the groove wall 40.

As can be seen most readily from FIG. 2, the leaf spring 21 extends longitudinally of the groove 20. This freely permits relative sliding of the body member 10 and the yoke 11 without spragging of the leaf spring. Also the arrangement of the leaf spring 21 between the yoke and the radially inner groove wall 40 has the advantage that should the leaf spring break the yoke can only fall radially inwards and not radially outwards so that the yoke or other movable parts of the brake cannot foul the rotating hub of the wheel.

The spring 21a is of the opposite hand to the spring 21 shown in FIG. 4 but is otherwise identical to the spring 21.

Figure 5:
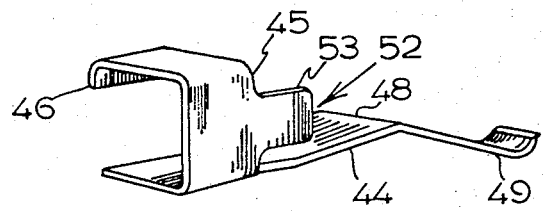
FIG. 5 is a detailed perspective view of another form of leaf spring which may be used in the brake of FIGS. 1 to 3 in place of the leaf spring of FIG. 4.

FIG. 5 illustrates a a modified leaf spring 52 to replace the spring 21 of FIGS. 1 to 4. The projection 50 is omitted and instead a tongue 53 extends from the side of the retaining clip 45. The tongue lies alongside the inner edge of the yoke 11 and prevents the spring 52 from turning out of the groove 20. With the use of the tongue 53 in place of the projection 50, the notch 51 in the yoke 11 is no longer required.

Figure 7:
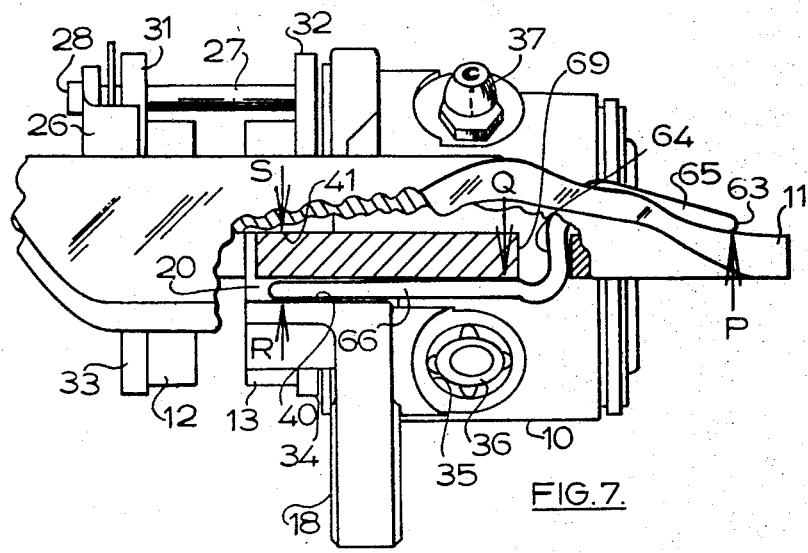
FIG. 7 is a side elevation partly sectioned on the line D—D of FIG. 8.
Figure 6:
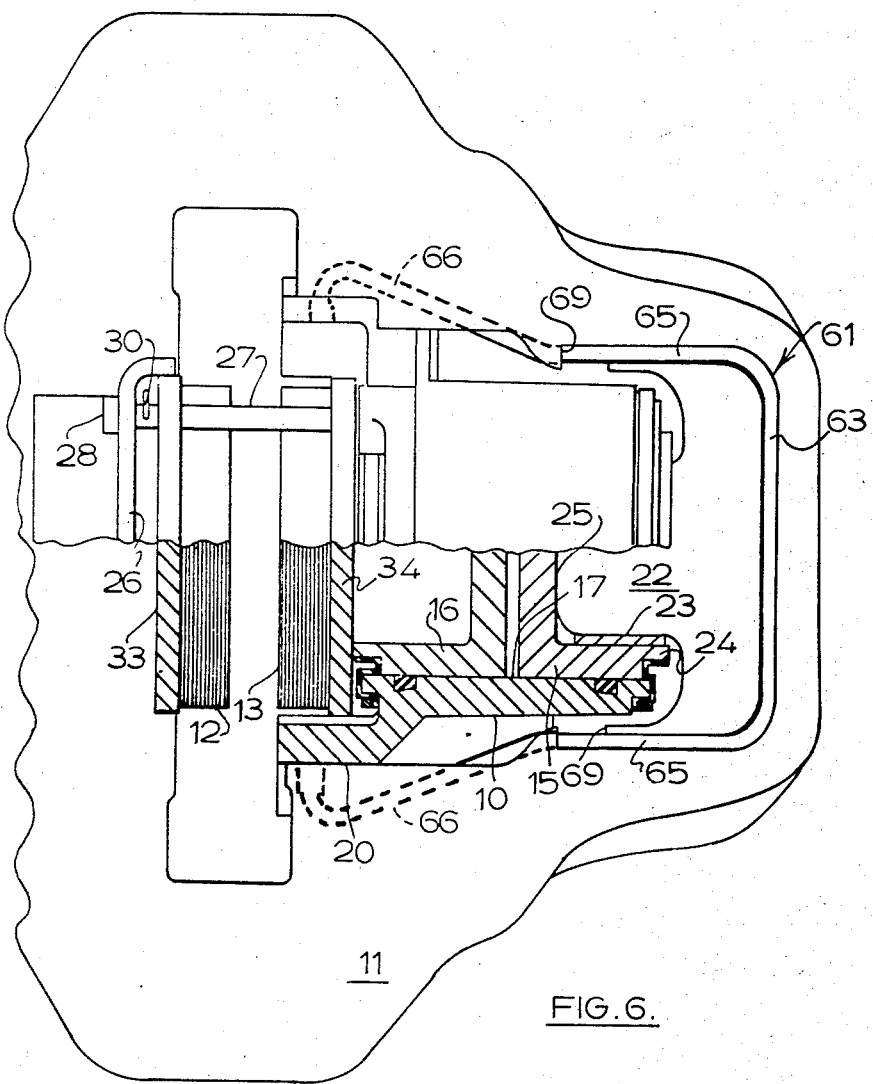
FIG. 6 is a plan view half sectioned on the line C—C of FIG. 8 of a second embodiment of disc brake.
Figure 9:
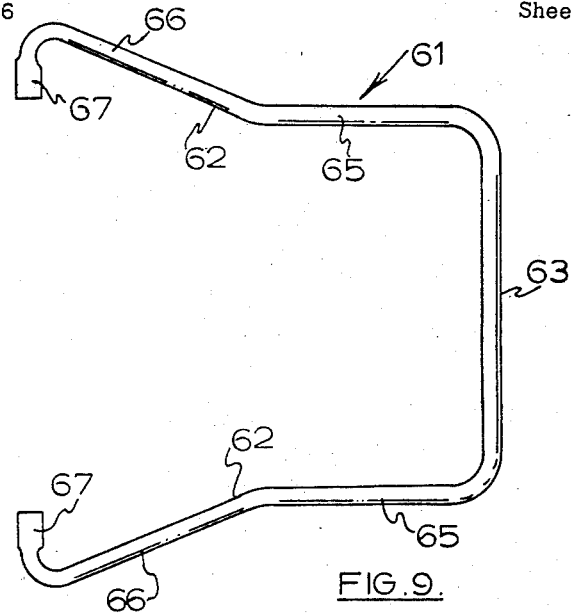
FIGS. 9, 10 and 11 are plan, side and end views, respectively, of a spring of the brake of FIGS. 6 to 8.
Figure 10:
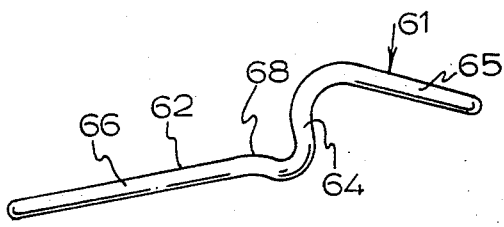
Figure 11:
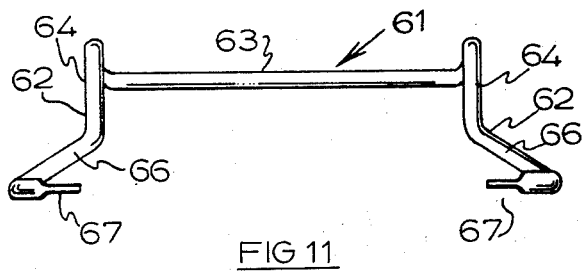

The brake of FIGS. 6 to 8 is generally like the brake of FIGS. 1 to 3 and like parts are denoted by like reference numerals and will not be described again separately with FIGS. 6 to 8. The brake of FIGS. 6 to 8 differs from that of FIGS. 1 to 3 principally in the provision of a composite wire spring 61 in place of the two leaf springs 21 and 21a. The wire spring 61 is shown in detail in FIGS. 9 to 11 and comprises two legs 62 joined by a transverse portion 63. Each leg 62 acts as a separate spring and comprises a generally vertical mid portion 64, a support portion 65 joining the mid portion 64 to a respective end of the transverse portion 63 and a free portion 66 joined to the mid portion 64 and having inturned and flattened ends 67. The free portion 66 has a small kink 68 adjacent the vertical mid portion 64.

On assembly of the brake as shown in FIGS. 6, 7 and 8, the transverse portion 63 of the spring 61 and the support portions 65 of the spring legs 62 lie above the yoke 11 and the free portions 66 of the spring legs 62 lie below the yoke. The vertical mid portion 64 passes through a respective notch 69 in the yoke 11. Each leg extends longitudinally of the body grooves 20 and acts as a separate spring to perform the same function as the springs 21 and 21a of FIGS. 1 to 3. As shown by the arrow P in FIG. 7, the transverse portion 63 at the ends of the leg support portions 65 bears against the upper face of the yoke 11. The kink 68 bears against the lower face of the yoke 11 as indicated by the arrow Q in FIG. 7 and the inturned ends 67 bear against the radially inner side wall 40 of the groove 20 as shown by the arrows R in FIGS. 7 and 8. The yoke is thereby urged against the radially outer side wall 41 as indicated by the arrow S in FIG. 7.

The purpose of the transverse joining portion 63 is to hold the mid portions 64 in the notches 69 and to simplify assembly.

Although the tongue 22 on the yoke 11 is shown in all the described embodiments as being supported in a bore formed in a piston of the hydraulic actuator, it is envisaged that this tongue could be supported in a similar manner in a blind bore formed in another operative component of a hydraulic actuator, such as a cylinder member.

Although the invention is shown as applied to a disc brake in which the body member is normally fixed it is also applicable to a disc brake in which the directly operated pad is fixed to the body member and in which the body member can swing about an axis perpendicular to the wheel axis.

I claim:

1. A spot type disc brake comprising a body member; a directly operated brake pad supported on said body member, said body member having longitudinal grooves along opposite sides thereof and said grooves having opposed side walls; a yoke having opposite internal edges slidably received in said grooves with substantial clearance with respect to said side walls thereof; an indirectly operated brake pad supported on said body member opposite said directly operated brake pad; a hydraulic actuator operative between said yoke and said directly operated pad; and an elongate wire-like spring member arranged in each of said grooves and extending longitudinally thereof between said yoke and one of said opposed side walls of said grooves to resiliently urge said yoke against the other of said opposed side walls of said grooves, each wire-like spring member having a mid portion passing through said yoke from one side thereof to the other, a support portion extending from one end of said mid portion at one side of said yoke, an end of the support portion bearing against one face of the yoke, and a free portion extending from the other end of said mid portion at the other side of said yoke, said free portion having a kink adjacent said mid portion, said kink bearing against the other face of said yoke and the end of said free portion bearing against said one side wall of the respective groove in said body member.

2. A disc brake according to claim 1 in which said ends of said free portions of the spring engaging said groove side wall are inturned.

3. A disc brake according to claim 1 in which each wire-like spring member constitutes one leg of a composite U-shaped spring.

4. A disc brake according to claim 3 in which said composite U-shaped spring has a transverse portion joining said ends of said support portions.

5. A spot type disc brake comprising a rotatable disc; a body member adjacent one side of said disc; a directly operated brake pad supported adjacent said body member, said body member having longitudinal grooves along opposite sides thereof with their longitudinal axes extending towards said disc; said grooves having opposed side walls; a yoke having opposite internal edges slidably received in said grooves with substantial clearance with respect to said side walls thereof; an indirectly operated brake pad supported opposite said directly operated brake pad to be acted upon by said yoke; a hydraulic actuator operative between said yoke and said directly operated pad; and an elongated leaf spring arranged in each of said grooves with its longitudinal axis parallel to the longitudinal axis of the groove, said leaf spring having bearing surfaces spaced apart along the axis of the groove and respectively engaging one of said opposed side walls of said groove and the face of said yoke opposing said one side wall only at the spaced apart locations of said bearing surfaces to resiliently urge said yoke against the other of said opposed side walls of said grooves.

6. A disc brake according to claim 5 including means on each of said leaf springs attaching the leaf springs to said yoke, each of said leaf springs having a rounded end longitudinally spaced from said attaching means, said bearing surface in engagement with said one groove side wall being on said rounded end.

7. A disc brake according to claim 5 in which said leaf springs are arranged between the radially inner ones of said groove side walls and said yoke to resiliently urge said yoke against the radially outer ones of said groove side walls.

8. A disc brake according to claim 5 in which said actuator comprises an open-ended bore in said body member and a pair of opposed pistons slidable in said bore, one piston acting upon said directly operated pad and the other piston acting upon said yoke.

9. A disc brake according to claim 8 in which said other piston has a blind bore therein and said yoke has a tongue thereon inwardly directed into said blind bore of said other piston and bearing against the base of said blind bore, and in which an insert member in which said tongue is located is received in said blind bore in said other piston.

10. A disc brake according to claim 5 in which each said leaf spring has a U-shaped clip thereon engaging around the inner edge of the yoke, said clip having a bearing surface spaced longitudinally from the previously mentioned bearing surfaces and engaging the other face of said yoke.

11. A disc brake according to claim 10 in which said yoke has a pair of holes adjacent said opposite sides of said body member and said U-shaped clip has an inward projection engaging in a respective one of said holes in said yoke.

12. A disc brake according to claim 10 in which said clip is at one end of said leaf spring whose other end has said bearing surface thereon engaging said one side wall of said groove and said leaf spring has a kink between said ends thereof, said bearing surface in engagement with one face of said yoke being on said kink.

13. A disc brake according to claim 12 in which each of said leaf springs has a rounded end longitudinally spaced from said U-shaped clip, said bearing surface in engagement with said one groove side wall being on said rounded end.

14. A disc brake according to claim 12 in which said yoke has a pair of notches adjacent said opposite sides of said body member and said other end of said leaf spring has a side projection thereon which locates in one of said notches in said yoke to keep that end of the spring in said groove.

15. A disc brake according to claim 12 in which said U-shaped clip has a tongue projecting therefrom alongside said internal edges of said yoke to keep said other end of said leaf spring in said groove.

References Cited

UNITED STATES PATENTS

| | | | |
|---|---|---|---|
| 2,970,869 | 2/1961 | Thomas | 308—11 |
| 3,158,230 | 11/1964 | Chouings | 188—73 |
| 3,245,500 | 4/1966 | Hambling et al. | 188—73 |

GEORGE E. A. HALVOSA, *Primary Examiner.*

U.S. Cl. X.R.

188—205